United States Patent [19]

Fahey et al.

[11] Patent Number: 5,077,331

[45] Date of Patent: Dec. 31, 1991

[54] POLYVINYL CHLORIDE LUBRICANT

[75] Inventors: Timothy E. Fahey; Julia A. Falter, both of Williamsport; Larry K. Hall, Cogan Station, all of Pa.

[73] Assignee: Lonza Inc., Fair Lawn, N.J.

[21] Appl. No.: 144,524

[22] Filed: Jan. 15, 1988

[51] Int. Cl.$^5$ ............................................. C08K 5/10
[52] U.S. Cl. ..................................... 524/317; 524/567; 524/569
[58] Field of Search ................. 524/317, 567, 569

[56] References Cited

U.S. PATENT DOCUMENTS

| | | | |
|---|---|---|---|
| 2,316,169 | 4/1943 | Japs | 524/317 |
| 3,917,555 | 11/1975 | Worschech | 524/317 |
| 4,363,891 | 12/1982 | Rosen | 524/317 |
| 4,421,886 | 12/1983 | Worschech | 524/317 |

FOREIGN PATENT DOCUMENTS 23246  3/1974  Japan .................................. 524/317

*Primary Examiner*—Joseph L. Schofer
*Assistant Examiner*—Peter D. Mulcahy
*Attorney, Agent, or Firm*—Darby & Darby

[57] ABSTRACT

Propylene glycol esters of unsaturated fatty acids having from 8 to 20 carbon atoms are found useful as internal lubricants for polyvinyl chloride. As compared to commonly used materials, the use of propylene glycol ester results in improved optical properties, as for example low yellowing after processing and resistance to hazing upon immersion in liquids. The lubricants are used in the manufacture of PVC by bulk or suspension polymerization. Broadly from 0.1 to 5 wt. % of the ester is incorporated into the resin.

9 Claims, No Drawings

POLYVINYL CHLORIDE LUBRICANT

BACKGROUND OF THE INVENTION

It has long been recognized that internal necessary for the processing of polyvinyl chloride resins. These materials reduce the internal friction within the polymer melt and, in turn, the heat build-up when the polymer is subjected to stress. Because of the characteristic high melt viscosities of rigid PVC, an internal lubricant is considered necessary to improve flow properties. Its use results in an economic advantage in that less work need be expended at a given set of processing conditions. In addition, the appearance of the product is improved. An internal lubricant also promotes fusion. Conversely, a lack of lubricant causes heat build-up during processing and results in a rough surface and a degraded product.

Perhaps the most widely used internal lubricants are the oleate and stearate esters of glycerol, though numerous other materials have been taught by the prior art. For example, U.S. Pat. No. 3,479,309 describes the use of fatty acid or ester lubricants such as stearic, palmitic, myristic and hydrogenated tallow fatty acid and the glycerides thereof. The addition of unsaturated fatty acids or the polyvalent metal salt thereof is also described so that the blend has an iodine number of from 2.5 to 20.

U.S. Pat. No. 3,679,619 mentions the use of long chain acids and alcohols such as stearic acid, nonadecanoic acid, arachidic acid, montanic acid, stearyl alcohol, carnaubyl alcohol, cetyl alcohol and montanyl alcohol; esters of polyhydric alcohols and short chain monocarboxylic acids such as glycerol monostearate, ethylene glycol dilaurate, 2-ethylhexane diol-1,3-distearate, ethylene glycol di-2-ethylhexanoate and octylene glycol dicaprylate and esters of dicarboxylic acids with short chain monohydroxy-alcohols, such as diisooctyl sebacate and dilauryl azelate.

Monoglycerine esters, stearic acid and stearic alcohol are noted in U.S. Pat. No. 3,981,838 and derivatives of trimellitic acid or anhydride are proposed.

In U.S. Pat. No. 3,988,330 it is claimed that the reaction product of mono- and polyfunctional alcohols with high molecular weight branched and straight chain aliphatic monocarboxylic acids obtained from alpha-olefins containing 22 or more carbon atoms are particularly useful for internal-external lubrication of PVC homopolymers and copolymers. The mono- and polyfunctional alcohols include monohydric alcohols, di- and higher polyhydric alcohols and ether alcohols, which can be either mono- or polyfunctional. The aliphatic monohydric alcohols include ethanol, n-propanol, sec-propanol, n-butanol, t-butanol, isoamyl alcohol, n-hexanol, 2-ethylhexanol, n-octanol, isodecanol, capryl alcohol, lauryl alcohol, myristyl alcohol, cetyl alcohol, stearyl alcohol and oxo alcohols such as tridecyl alcohol, which is mainly tetramethyl-1-nonanol, and hexadecyl alcohol, which is a complex mixture of primary alcohols. The aliphatic polyols named are ethylene glycol, 1,2-propylene glycol, 1,3-propylene glycol, 1,2-butanediol, 1,3-butanediol, 1,4-butanediol, 1,5-pentanediol, 3-methyl-1,5-pentanediol, 2,3-dimethyl-2,3-butanediol, trimethylol propane, mannitol, sorbitol, glycerol and pentaerythritol.

Known PVC lubricants are described in U.S. Pat. No. 4,081,413 including mineral oil; fatty acids; synthetic waxes of the fatty amide and ester type; octyl stearate; calcium stearate; the corresponding citrates and citrate esters, particularly the citrate esters of medium- (e.g., 10 carbon atoms and above) and long-chain carboxylic acids; and the glyceride esters of the medium- and long-chain saturated and unsaturated carboxylic acids.

Ethylene oxide-capped polyether propylene glycol block copolymer lubricants for PVC are taught in U.S. Pat. No. 4,168,256. Graft polyblends of acrylate esters to improve PVC flow properties are described in U.S. Pat. No. 4,212,958.

Though the above-described internal lubricants have achieved the intended result, they have not been ideal for a variety of reasons. For example, compounds containing the glycerol esters can degrade during processing, which causes yellowing to occur in clear applications. This initial degradation is accelerated by the presence of unreacted glycerol. Furthermore, where the compound is initially transparent, the optical properties (clarity and haze) are often adversely affected by contact with various fluids such as water, vinegar and alcohol.

BRIEF DESCRIPTION OF THE INVENTION

In accordance with the invention, it has now been discovered that the use of propylene glycol esters of unsaturated acids as internal lubricants for PVC overcomes the aforementioned problems and is particularly desirable for polymers and copolymers of vinyl chloride prepared by bulk or suspension polymerization. The benefits of the invention are most clearly recognized in connection with transparent and translucent PVC formulations such as blow-molded bottles, extruded films and sheets and calendered sheets. Generally from 0.1 to 5.0% of the propylene glycol esters are included, preferably from 0.5 to 2%, based on the total resin composition. The esters are formed from unsaturated carboxylic acids having from 8 to 20 carbon atoms, most preferably from 16 to 18.

DETAILED DESCRIPTION OF THE INVENTION

The subject invention may be applied to a broad range of polyvinyl chloride homopolymers and copolymers. The term "polyvinyl chloride," as used in the instant invention includes polyvinyl chloride, chlorinated polyvinyl chloride, and comonomers with vinyl acetate, vinyl formate, alkyl vinyl ethers, ethylene, propylene, butylene, vinylidene chloride, alkyl acrylates and methacrylates, alkyl maleates and alkyl fumarates. Preferably, at least 80% of the copolymer is vinyl chloride.

The techniques for polymerizing polyvinyl chloride are well known in the art and need not be described in detail. Generally the polymers have number average molecular weights ranging from 15,000 to 60,000. Of particular interest are compositions used for bottle-molding and for the extrusion of films and sheets. For the former applications, molecular weights ranging from 25,000 to 35,000 are typical, while for the latter extrusion processes from 45,000 to 55,000 are used.

Bottles are prepared by blow-molding. An extruder melts the plastic material and extrudes it into a parison shape (a hollow, round tube). The parison is clamped in a mold and inflated by blowing gas into the parison. PVC is commonly used to produce bottles for foods, cooking oils, cleaners and toiletries. In any PVC blow-molding operation, there is a tendency for the material to turn yellow due to the thermo-mechanical stress induced during processing. The ability to retain the material's initial color and minimize yellowing for a prolonged period of time is a desirable compound characteristic. It is also important for the bottle to retain its high clarity when filled with product. The lubricants of the instant invention enhance all of these properties relative to conventionally used lubricants.

Films and sheets can be prepared by extrusion or calendering. In extrusion of cast films or sheets, the extruder melts the material and forces it through a slit die of the appropriate dimensions. The material is then taken off by chilled rolls and wound onto bobbins. In a blown film extrusion, the material is extruded through a tubular die and subsequently blown out into the desired thickness before cooling. This process is used to make plastic bags.

Calendering of films and sheets involves fluxing of the material on a series of heated rolls with varying nips between them. Once the material is fluxed, it can be removed from the rolls as a continuous sheet. Swimming pool liners and shower curtains are two common applications for calendered sheets. In any of these extrusion or calendering operations, it is again important to retain initial color and to maximize clarity.

With regard to the propylene glycol esters, these may be formed from any unsaturated monocarboxylic fatty acid having from 8 to 20 carbon atoms, preferably from 16 to 18. Acids having fewer than 8 carbon atoms are too volatile and produce an unpleasant odor. Examples of usable fatty acids are oleic, linoleic, linolenic, ricinoleic, palmitoleic, myristoleic and lauroleic acids.

It will be understood that the propylene glycol esters as defined above may be used alone or in combination. In addition, these esters may be combined with conventional lubricants such as known esters of fatty acids containing from 8 to 22 carbon atoms and with mono- and polyfunctional alcohols including monohydric alcohols, di- and higher polyhydric alcohols, and mono- and polyfunctional ether alcohols. In order to achieve the advantage of the instant invention, at least 25% of the polypropylene glycol esters of an unsaturated carboxylic acid having from 8 to 20 carbon atoms should be used.

Internal lubricants of the type claimed in this disclosure may be mixed with the resin and other additives in a high speed powder blender. Alternatively, the lubricants may be incorporated into the resin in a high intensity melt mixer, such as a Banbury mixer, or in a continuous extrusion type mixer of either single or multiple screw design.

Typical formulations for tin-stabilized blow-molded bottles, metal soap-stabilized blow-molded bottles, and extruded plasticized films are shown in the following table:

TABLE

| | Tin-Stabilized Bottles | Metal Soap-Stab. Bottles | Extruded Films |
|---|---|---|---|
| PVC Suspension or Mass Resin ($M_n$ = 25,000–35,000) | 100 | 100 | — |
| PVC Suspension or Mass Resin ($M_n$ = 45,000–55,000) | — | — | 100 |
| Octyl Tin Mercaptide Stabilizer | 2.0 | — | — |
| Acrylic Processing Aid | 2.0 | 2.0 | — |
| Acrylic Impact Modifier | 12.0 | 10.0 | — |
| Blue Toner | 0.05 | 0.05 | 0.05 |
| Ca/Zn Stabilizer | — | 0.5–1.0 | 0.5 |
| Epoxidized Soybean Oil | — | 5.0 | 5.0 |
| Phosphite Chelator | — | 1.0 | 1.0 |
| External Lubricant | 0.2–1.0 | 0.2–1.0 | 0.1–0.5 |
| Internal Lubricant | 1.0–2.0 | 1.0–2.0 | 0–1.0 |
| Dioctyl Adipate Plasticizer | — | — | 35 |

To obtain processable molding compositions, various additives must be added to the PVC resin in addition to the lubricants. These include stabilizers, plasticizers, processing aids, fillers and colorants. In some cases, UV stabilizers, flame retardants, fungicides and blowing agents are also added.

Stabilizers prevent degradation during processing due to the elevated temperatures generated and are well known. Generally organometallic salts based on tin, lead, barium-cadmium, calcium and zinc are useful, including dibutyltin-beta-mercaptopropionate, dibutyltin maleate, barium, cadmium and/or lead stearate complexes. The stabilizers act primarily to neutralize the volatiles formed as decomposition products during processing of the PVC resins, particularly hydrogen chloride vapor. Thus, an amount of stabilizer must be added to be just sufficient to prevent hydrogen chloride evolution. In general from about 1 to 3% by weight of the total molding composition of one or more of the stabilizers is employed.

Plasticizers are added to impart flexibility to the molded vinyl composition and to provide a lower melt viscosity to the mixture during blending. This reduces the internal friction during the molding process. Commonly employed plasticizers include phthalate, phosphate, adipate and azelate esters, as well as epoxidized oils. Suitable plasticizers include diisooctylphthalate, glycerol tribenzoate, and epoxidized soybean oil having a molecular weight of about 1000. Chlorinated paraffin waxes can also be used. The amount of plasticizer employed depends on the rigidity required in the final product and may be as high as 75% of the weight of resin.

Processing aids are added to increase the melt strength during processing and molding operations and to reduce the melt viscosity and elasticity of the molding composition. Commonly employed processing aids include styrene-acrylonitrile resins and methylmethacrylate copolymers such as polymethylmethacrylate resins. The amount of processing aid added is generally in the range of from 2 to 10% of the total molding composition.

The present molding compositions can be prepared by mixing all of the solid ingredients first in a high shear blender, such as a Henschel mixer, until the temperature reaches about 50° C. and then adding the liquid ingredients with continued mixing until the temperature reaches about 70° C. While the dry blended molding composition can be used directly, more generally it is charged to a plasticizing mixer, such as an extruder or Banbury mixer, which melts the composition. The melt is cooled to solidify it, and pelletized or granulated for storage.

In order to further illustrate the invention, attention is directed to the following example:

EXAMPLE

PVC resin compositions were prepared by initially mixing the resin in a Henschel mixer, Model FM10, at 2300 rpm to 75° C. A stabilizer was then added and mixing continued to 95° C. Impact modifier, processing aid, lubricants and toner were added sequentially and mixed to 115° C. The compound discharged from the mixer was cooled at room temperature on kraft paper and stored in a plastic bag.

The compounds prepared contained 100 parts of mass or suspension polymerization resin, 2 parts of octyltin mercaptide stabilizer (M&T Chemicals T-831), 12 parts of acrylic processing aid (Rohm & Haas BTA-III), 2 parts of acrylic processing aid (Rohm & Haas K-120ND), 0.05 part of blue toner, and 0.2 part of external lubricant (Lonza Inc. Glycolube PG).

As set forth in the following tables, 1.0, 1.5 and 2.0 parts of internal lubricant were added to the above composition.

The test procedures employed were as follows:

OPTICAL PROPERTIES

The optical sensor, Model D25P-2, of the Hunterlab Tristimulus Colorimeter was standardized for transmission measurements. A 2×3×0.050 inch plaque, compression molded from extruded tapes, was placed at the transmission port and the total and diffuse values of L, a, b, and Y were recorded. Light transmission, measured as the L value, is the percentage of total light transmitted through the plaque. Haze is defined as follows:

$$Haze = \% \ Y_D/Y_T \times 100$$

$Y_D$ = Diffuse Transmittance Value
$Y_T$ = Total Transmittance Value
The sensor was standardized for total transmission measurements using Y, X and Z. These values are recorded for each sample. Yellowness index is calculated according to the following equation:

$$\text{Yellowness Index} = 125 \ (X\% - Z\%) / Y$$

where $X\% = X/0.98041$
$Z\% = Z/1.18103$

EARLY COLOR

A Brabender Plasticorder, Model EPL-V3302, was equipped with a No. 6 rollerhead, roller blades and a quick loading chute. The roller head was allowed to equilibrate at a bowl temperature of 187° C. for 15 minutes. The blades were turned on with a rotor speed of 70 rpm and a 55.0 gm sample introduced into the mixing bowl through the quick loading chute in a maximum of 20 seconds. The loading chute was removed one minute after fusion. Two minutes after fusion the rotors were stopped, the sample removed from the bowl with a warm spatula and the rotors restarted immediately (sampling was completed in a maximum of 5 seconds). The hot sample is molded into a three-quarter inch button with a hand mold press. Excess was trimmed off and returned to the bowl. Sampling was repeated at 3, 4, 5, 6, 7 and 8 minutes. Buttons were visually inspected for the onset of early color.

BLUSH EVALUATION

A 5×6×0.02 inch plaque was pressed from milled sheets, then cut into 1×3 inch test strips. One-and-a-half inches of the test strip was suspended in the test fluid. These samples were aged at room temperature and 50° C. for 14 and 35 days. Haze and light transmission measurements were taken on the exposed and unexposed portion of test strips.

The test mediums were distilled water, vinegar, and a 50% alcohol solution (100 proof vodka).

The following table shows the results obtained by the foregoing tests, Table I showing the test results employing a PVC mass polymerization resin, Table II showing a PVC suspension polymerization resin:

TABLE I

| PVC Mass (Bulk) Resin-Based Compounds | | | | |
|---|---|---|---|---|
| | Glyceryl mono oleate (GMO) | Glyceryl mono stearate (GMS) | Propylene glycol monooleate (PGMO) | Propylene glycol dioleate (PGDO) |
| A. Extrudate Yellowness and Early Color Hold | | | | |
| Yellowness Index | | | | |
| 1.0 phr | 2.6 | 2.6 | 1.7 | 1.0 |
| 1.5 phr | 2.4 | 2.2 | 1.3 | 0.1 |
| Early Color Hold | | | | |
| 1.0 phr | Ex | Good | Ex | Ex |
| 1.5 phr | Ex | Good | Ex | Ex |
| 2.0 phr | Ex | Good | Ex | Ex |
| B. Blush Properties % Increase in Haze (35 days @ 50° C.) | | | | |
| Water 1.0 phr | 2.9 | 6.0 | 4.1 | 4.5 |
| 1.5 phr | 7.4 | 8.0 | 4.8 | 4.8 |
| 2.0 phr | 15.5 | 19.8 | 2.9 | 6.9 |
| Vinegar 1.0 phr | 4.1 | 6.2 | 4.2 | 4.0 |
| 1.5 phr | 5.0 | 8.8 | 6.3 | 5.1 |
| 2.0 phr | 11.8 | 14.0 | 3.5 | 3.7 |
| Alcohol 1.0 phr | 1.5 | 2.5 | 3.7 | 1.5 |
| 1.5 phr | 4.1 | 4.0 | 2.7 | 3.0 |
| 2.0 phr | 12.0 | 7.2 | 2.7 | 2.3 |

TABLE II

| PVC Suspension Resin-Based Compounds | | | | |
|---|---|---|---|---|
| | Glyceryl mono oleate (GMO) | Glyceryl mono stearate (GMS) | Propylene glycol monooleate (PGMO) | Propylene glycol dioleate (PGDO) |
| A. Extrudate Yellowness and Early Color Hold | | | | |
| Yellowness Index | | | | |
| 1.0 phr | 2.5 | 2.1 | 1.6 | 0.03 |
| 1.5 phr | 1.8 | 1.8 | 1.0 | −0.6 |
| Early Color Hold | | | | |
| 1.0 phr | Good | Good | Ex | Ex |
| 1.5 phr | Ex | Ex | Ex | Ex |

As shown in Table I, yellowness of the extruded PVC tapes is lowered by using propylene glycol monooleate or propylene glycol dioleate instead of the conventional internal lubricants, glyceryl monooleate or glyceryl monostearate. The greatest reduction in yellowness occurs in the system containing propylene glycol dioleate. In addition, the early color hold or resistance to the onset of yellowness is excellent for both propylene glycol oleates, an improvement relative to glyceryl monostearate. Table I also demonstrates improved blush properties for PVC formulations containing the propylene glycol oleates. Smaller haze increases occur on exposure to water, alcohol or vinegar when propylene glycol monooleate or propylene glycol dioleate lubricants are used in place of glyceryl monooleate or glyceryl monostearate. These improvements are emphasized as the level of lubricant is increased.

Table II confirms that similar improvements in yellowness and early color hold are achieved in formulations based on suspension-polymerized PVC. Use of propylene glycol monooleate causes a smaller reduction in extrudate yellowness compared to systems containing glyceryl monooleate or glyceryl monostearate. A propylene glycol dioleate lubricant provides a substantial improvement in extrudate yellowness.

Both propylene glycol oleates improve early color hold relative to the glyceryl esters when compared at 1.0 phr loadings.

We claim:

1. A rigid polyvinyl chloride bottle-molding composition which is formable at elevated temperature and is a shape-retaining solid at room temperature, which comprises:
   (a) a rigid polyvinyl chloride resin having a molecular weight from 25,000 to 35,000, comprising a polyvinyl chloride homopolymer or a polyvinyl chloride copolymer; and
   (b) an internal lubricant consisting of propylene glycol ester of an unsaturated carboxylic acid having from 8 to 20 carbon atoms.

2. A rigid polyvinyl chloride composition for the extrusion of films and sheets which is formable at elevated temperature and is a shape-retaining solid at room temperature, which comprises:
   (a) a rigid polyvinyl chloride resin having a molecular weight from 45,000 to 55,000, comprising a polyvinyl chloride homopolymer or a polyvinyl chloride copolymer; and
   (b) an internal lubricant consisting of propylene glycol ester of an unsaturated carboxylic acid having from 8 to 20 carbon atoms.

3. The polyvinyl chloride composition of claim 1 or 2 wherein the internal lubricant comprises from 0.1 to 5 wt. % of the total composition.

4. The polyvinyl chloride composition of claim 1 or 2 wherein the stabilizer is a tin stabilizer.

5. The polyvinyl chloride composition of claim 4 wherein the stabilizer is a tin stabilizer.

6. The polyvinyl chloride composition of claim 1 or 2 wherein the composition is a clear plastic material.

7. The polyvinyl chloride composition of claim 1 or 2 wherein the unsaturated carboxylic acid is oleic acid.

8. The polyvinyl chloride composition of claim 1 or 2 wherein the unsaturated carboxylic acid is linoleic acid.

9. A rigid polyvinyl chloride composition which comprises a rigid polyvinyl chloride and a propylene glycol diester of an unsaturated carboxylic acid having from 8 to 20 carbon atoms as an internal lubricant therefor.

* * * * *